(12) United States Patent
Buisman

(10) Patent No.: US 8,636,017 B2
(45) Date of Patent: Jan. 28, 2014

(54) METHOD OF WASHING EGGS

(71) Applicant: FPS Food Processing Systems B.V., Nootdorp (NL)

(72) Inventor: Paul Buisman, Scherpenzeel (NL)

(73) Assignee: FPS Food Processing Systems B.V., Nootdorp (NL)

( * ) Notice: Subject to any disclaimer, the term of this patent is extended or adjusted under 35 U.S.C. 154(b) by 0 days.

(21) Appl. No.: 13/630,068

(22) Filed: Sep. 28, 2012

(65) Prior Publication Data

US 2013/0074877 A1    Mar. 28, 2013

Related U.S. Application Data

(62) Division of application No. 12/294,456, filed as application No. PCT/NL2007/050129 on Mar. 27, 2007, now abandoned.

(30) Foreign Application Priority Data

Mar. 27, 2006  (EP) ..................................... 06076064

(51) Int. Cl.
*B08B 3/04* (2006.01)
(52) U.S. Cl.
USPC ...................................................... 134/104.2

(58) Field of Classification Search
USPC ....................................................... 134/104.2
See application file for complete search history.

(56) References Cited

FOREIGN PATENT DOCUMENTS

JP            09-186128       *   7/1997

OTHER PUBLICATIONS

Ichinose et al., Jul. 1997, JP 09-186128, English machine tranlsation.*

* cited by examiner

*Primary Examiner* — Jason Ko
(74) *Attorney, Agent, or Firm* — Stites & Harbison PLLC; Marvin Petry

(57) ABSTRACT

A method of washing eggs in a manner which allows controlling the level of pollutants of the washing fluid. At least two sprayer units are located over a conveyor in which eggs to be washed travel in a conveying direction. The eggs are engaged by a brush at each sprayer station. At least two sprayer units located over the conveyor receive washing fluid, spray the washing fluid over the eggs and collect the washing fluid in a collector. The intake of washing fluid, the spraying of the washing fluid and the collecting of the washing fluid at each of the sprayer units is confined to that sprayer unit. Each sprayer unit except the farthest downstream sprayer unit receives washing fluid from the collector of the next downstream sprayer unit.

9 Claims, 1 Drawing Sheet

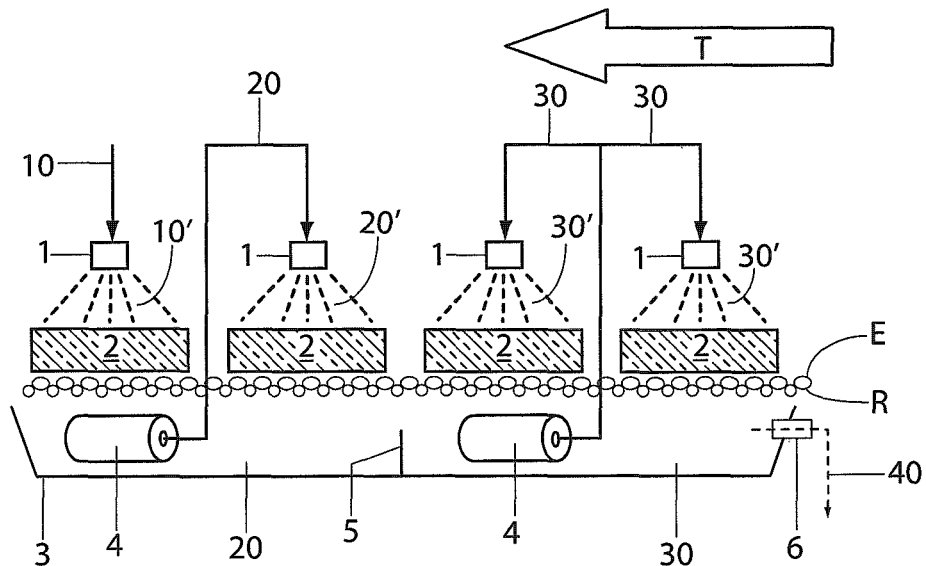
PRIOR ART Fig. 1
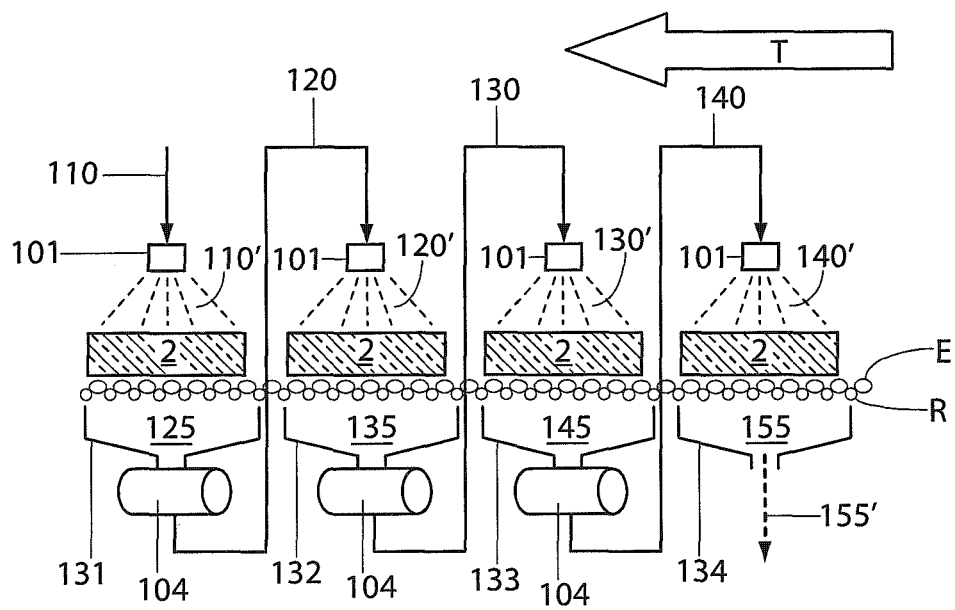
Fig. 2

METHOD OF WASHING EGGS

FIELD OF THE INVENTION

The present invention relates to a method for washing eggs.

BACKGROUND OF THE INVENTION

An apparatus is known from U.S. Pat. No. 4,985,956 in which, above a well-defined part of an egg conveyor, in succession, alternately, sprayers and brushes are arranged. This succession starts and ends with a single spray portion. For the washing cycle used here, the washing liquid is supplied to the washing unit as a whole and used only once. The amount of washing liquid, mostly water and optionally water with additions used in such an apparatus, is enormous. In situations where large sorting machines are deployed, i.e. machines processing more than 100k eggs per hour, this means both a large burden to the water supply and huge costs for the user.

Further, in this technology, washers are utilized that operate according to the principle, or strongly resembling the principle, represented hereinafter in FIG. 1. This technology has in common with the one mentioned hereinabove that substantially one single large collecting reservoir is used as also known from U.S. Pat. No. 4,985,965, with, further, a partition. In both variants, the eggs are supplied in the usual manner and conveyed with a roller conveyor.

In FIG. 1, an apparatus is represented in which by a single sprayer unit, fresh washing liquid or washing fluid is supplied. In this set-up, upstream, three further units are used. Basically, all liquid or fluid is collected in the same large reservoir with an overflow edge after the first two units. After use of the fresh liquid, the liquid from the corresponding part of the reservoir is directly reused downstream. In the second part of the reservoir, the liquid is distributed over the two units and reused. At the upstream end of the reservoir, there is an overflow for discharging liquid having ended up there.

With such a type of washing apparatus, the washing result is not clear because of the manner the washing liquid is reused. Although the eggs farthest downstream are always washed with fresh liquid, the eggs in the preceding stages are sprayed with liquid already used, the degree of pollution of which can vary greatly. More particularly, the through-flow for freshening can be so poor that, stepwise, not mildly but highly polluted washing liquid is reused. This causes the final washing result to be greatly variable and unpredictable.

SUMMARY OF THE INVENTION

In order to avoid these shortcomings, the invention provides a method and apparatus for washing eggs, wherein the apparatus is provided with:
an endless roller conveyor, which extends in a conveying direction and which, in use, conveys the eggs in the conveying direction;
at least two sprayer units, arranged above the roller conveyor in succession viewed in the conveying direction, each provided with a fluid supply opening for, in use, supplying washing fluid to the respective sprayer unit,
wherein the roller conveyor is transmissive to washing fluid, wherein under each sprayer unit a washing fluid collector corresponding therewith is arranged, wherein each washing fluid collector is provided with a discharge opening, wherein, apart from the washing fluid collector farthest upstream, the discharge opening of each fluid collector is in fluid communication with the fluid supply opening of a sprayer unit which, viewed in the conveying direction, is directly upstream from the sprayer unit corresponding to the respective washing fluid collector.

With such a method and apparatus, in use, a well-defined flow of washing fluid is obtained, while downstream the sprayer unit, viewed in conveying direction, can be fed with fresh washing fluid, and wherein the sprayer units located further upstream are fed with washing fluid coming from the washing fluid collector of the sprayer unit located directly downstream therefrom. The eggs located downstream on the conveyor are therefore sprayed with fresh washing fluid. As they lie further upstream, the eggs located further upstream on the conveyor are sprayed with more and more frequently reused washing fluid.

With the method and apparatus according to the invention, a well-defined and well-settable flow of washing fluid is obtained in a very suitable manner.

In a further embodiment, the apparatus according to the invention is characterized in that the apparatus comprises n sprayer units, n being a natural number greater than 2, wherein, by sprayer unit k washing fluid is reused, substantially coming from the downstream sprayer unit (k+1).

With such an embodiment, in particular with a larger number of sprayer units disposed in succession in conveying direction, it is effected that the eggs located on the conveyor are sprayed with, each time, cleaner washing fluid. This in contrast with the apparatus according to the state of the art, whereby the degree of pollution of the washing fluid dispensed by the sprayer units could be highly variable, leading to an unpredictable washing result.

According to a still further embodiment of the invention, in each fluid communication between a discharge opening and a sprayer unit, a washing fluid pump is arranged.

It can thus be effected that in each fluid collector a desired level of washing fluid is maintained.

BRIEF DESCRIPTION OF THE DRAWINGS

Further details will be described with reference to FIGS. 1 and 2, wherein
FIG. 1 schematically shows an embodiment according to the prior art, and
FIG. 2 schematically shows an exemplary embodiment according to the invention.

DETAILED DESCRIPTION OF THE PREFERRED EMBODIMENTS

In the different Figures, the same pieces or parts have the same reference numerals.

FIG. 1 schematically shows a few details of the above-described apparatus from the prior art. Eggs E, lying, in a generally known manner, on and being conveyed by rollers R of an endless roller conveyor, are passed in conveying direction T through a washer. More particularly, the eggs E are passed along a washing device with four sprayer units 1, while successive washing fluid flows 10, 20 and 30 are utilized. The sprayer units 1 provide spray flows 10', 20', and 30'. These spray flows cooperate with brushes 2, for instance by passing the eggs, moistened by the spray flows, under and somewhat through the brushes, or by directly spraying the brushes with washing fluid. The substantially first flow 10-10' is collected and reused as second flow 20 by a pump 4. In the depicted large reservoir, a partition 5 is arranged, aiming to provide a division between liquid amounts downstream and upstream. The degree of supply of the first flow 10 to side of the washer farthest downstream is determinative of the degree of overflow from the downstream side to the upstream side.

After the overflow over the partition, the then collected liquid is reused, with a similar pump 4, as a flow 30 as spray flow 30', and sprayed over the eggs then arriving in the washer on the upstream side. On the upstream side of the reservoir, the most strongly polluted liquid is further discharged via an overflow 6 as flow 40, to be, for instance, purified and to then be used again as a flow 10, or to be discharged completely. As already stated hereinabove, the composition of this washing fluid flow will vary greatly, due to, substantially, differences in the extent of pollution of the eggs. It is further noted that at the start, such flows can have several desired compositions, in particular with respect to additions such as cleaning agents.

FIG. 2 schematically shows a washing device for eggs according to the invention. Here, the liquid flows are guided such that for each sprayer 101 there is provided therebeneath a brush 2, and beneath each brush 2, below the conveyor, there is provided, a collector receptacle 131, 132, 133 and 134, respectively, and the liquid 125, 135, 145 and 155, respectively, is collected therein. Liquid 125, 135 and 145 are used as washing fluid for the following upstream sprayer unit. More particularly, the farthest downstream sprayer unit 110 provides a spray flow 110' which is collected as liquid 125 and is thus reused at the next sprayer unit 120. This collected liquid 120 is pumped by a pump 104 to the next sprayer unit 120 and sprayed as spray flow 120' over subsequent eggs supplied in the direction T. Similarly, liquid 135 from collector 132 is delivered via a pump 104 to sprayer unit 130 and provides spray 130', and liquid 145 in collector 133 is delivered via a pump 104 to sprayer unit 140 where it is delivered as spray 140', which is collected as liquid 155 whereupon the then discharged flow 155' can, for instance, be purified and reused, or, can, also, be discharged. In an advantageous manner, thus, a fluid flow is obtained exhibiting a clear and controllable course of extent of pollution.

It will be clear to all skilled in the art that if desired, other numbers of compartments can be selected, generally n, having, from the preceding to a following, in upstream direction, the numbers (k+1), i.e., all as natural numbers. Compositions of liquids can be adjusted as required. Further, a drawn diagram can be repeated so that after, for instance, four compartments with fresh fluid, washing is continued.

Minor modifications in the set-up of the respective parts as shown in the apparatus according to the invention are understood to be included within the protective scope of the following claims.

The invention claimed is:

1. A method of washing eggs by exposing all surfaces of the eggs to a washing liquid from a plurality of sprayer units which include a first downstream sprayer unit and a second upstream sprayer unit, in a manner which allows controlling the level of pollutants of the washing liquid supplied to each sprayer unit, comprising the steps of:

conveying the eggs to be washed along a roller conveyor in a conveying direction from upstream to downstream, while turning the eggs so that all surfaces of the eggs are exposed to the washing liquid at each sprayer unit, engaging the eggs with a brush at each sprayer unit, and controlling the level of pollutants in the washing liquid at the sprayer units by confining the intake, spraying and collection of washing liquid at each sprayer unit to that sprayer unit, with the washing liquid delivered to the second sprayer unit being received from the washing liquid collected at the first sprayer unit, by the following steps:

supplying washing liquid into the first sprayer unit, causing the washing liquid therein to wash the eggs passing beneath the first sprayer unit and then collecting in a first collector all of and only the washing liquid sprayed from the first sprayer unit, delivering the washing liquid from the first conveyor into the inlet of the second sprayer unit, causing the washing liquid therein to wash the eggs passing beneath the second sprayer unit and then collecting in a second collector all of and only the washing liquid sprayed from the second sprayer unit.

2. A method according to claim 1, including using at least three sprayer units, each confining the intake, each having an inlet, a sprayer, and a collector, spraying and collecting of the washing liquid to that sprayer unit and delivering the washing liquid from its collector to the inlet of the sprayer unit located directly upstream therefrom, resulting in controlling the predictability of pollutants in the washing liquid in each of the at least three sprayer units.

3. A method according to claim 2, including delivering a supply of fresh washing liquid to the farthest downstream sprayer unit.

4. A method according to claim 3, including draining of the liquid collected in the farthest upstream collector.

5. A method according to claim 1, including draining of the liquid collected in the farthest upstream collector.

6. A method according to claim 1, including delivering a supply of fresh washing liquid to the farthest downstream sprayer unit and including draining off the liquid collected in the farthest upstream collector.

7. A method according to claim 1, including pumping washing liquid from each collector to the next upstream sprayer unit except for the farthest upstream collector.

8. A method according to claim 1, including delivering a supply of fresh washing fluid liquid to the farthest downstream sprayer unit.

9. A method according to claim 1, wherein there are n spraying units, n being a natural number greater than two, and wherein for any by sprayer unit k within the units n, washing liquid is reused substantially coming from the downstream sprayer unit (k+1).

* * * * *